(12) United States Patent
Minami (10) Patent No.: US 7,077,225 B2
(45) Date of Patent: Jul. 18, 2006

(54) FLIP-UP APPARATUS FOR HOOD OF VEHICLE

(75) Inventor: Tarou Minami, Zama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 11/069,998

(22) Filed: Mar. 3, 2005

(65) Prior Publication Data

US 2005/0206199 A1   Sep. 22, 2005

(30) Foreign Application Priority Data

Mar. 22, 2004  (JP) .......................... P2004-083436

(51) Int. Cl.
    *B62D 25/10*   (2006.01)
(52) U.S. Cl. ................................ 180/69.21; 296/187.09
(58) Field of Classification Search ........... 296/193.11, 296/187.04, 187.09; 180/69.21, 274, 281
    See application file for complete search history.

(56) References Cited

U.S. PATENT DOCUMENTS

| 6,257,657 B1 * | 7/2001 | Sasaki ................... 296/187.09 |
| 6,415,882 B1 * | 7/2002 | Schuster et al. ......... 180/69.21 |
| 6,439,330 B1 * | 8/2002 | Paye ...................... 180/69.21 |

FOREIGN PATENT DOCUMENTS

| DE | 197 12 961 A1 | 10/1998 |
| DE | 100 55 828 A1 | 5/2002 |
| JP | 2002-037128 A | 2/2002 |
| JP | 2002-37128 A | 2/2002 |

\* cited by examiner

*Primary Examiner*—Joseph D. Pape
(74) *Attorney, Agent, or Firm*—McDermott Will & Emery LLP (57) ABSTRACT

A flip-up apparatus is provided to lift up a hood of a vehicle. The apparatus includes a hinge device for the hood rotatably mounted on a vehicle body and an actuator for lifting up a hood at a vehicle collision. The hinge device has a first and a second arm supporting the hood rotatably to a frame member of the vehicle body and first and second lock plates rotatably supported on the under face of the hood to hold an active part of the actuator. In the upward movement of the active part of the actuator, the active part is held by the lock plates.

4 Claims, 7 Drawing Sheets

FLIP-UP APPARATUS FOR HOOD OF VEHICLE

BACKGROUND OF THE INVENTION

1. Field of the Invention

The present invention relates to a flip-up apparatus for a hood of a vehicle. More particularly, the invention relates to the flip-up apparatus that can lift up a rear end of the hood at a vehicle collision in order to secure a deformation of the hood thereby absorbing a collision impact.

2. Description of Related Art

An automobile is generally provided, on a front part thereof, with an engine compartment whose upper opening is covered with a hood. Among a variety of hoods, there is a hood whose rear end is lifted up by a predetermined amount at a vehicle collision although the hood is adapted so as to open and shut about the rear end in a normal state. The lift-up of the rear end of the hood allows its downward deformable span to be increased. Therefore, even if an external load (e.g. collision object) due to the collision is applied on the rear end of the hood, such collision energy can be effectively absorbed due to increased deformable span of the hood. Such a hood, namely, "flip-up" type hood is disclosed in Japanese Patent Application Laid-open No. 2002-37128.

SUMMARY OF THE INVENTION

In the earlier art, although the flip-up position of the hood at a vehicle collision is determined by a mechanical stopper of a hinge connecting the hood to a vehicle body, there is a problem of impossibility to control an acceleration rate of the flip-up operation of the hood.

Also noted, the conventional "flip-up" type hood is equipped with a hood-link lock that serves to lock the hinge in order to suppress rattling movement of the hood during a vehicle's normal traveling. At a vehicle collision, the upward movement of the actuator causes the hood-link lock to be deflected for release. That is, since kinetic energy of the actuator in its upward movement is partially utilized for the above deflection of the hood-link lock, the flip-up motion of the hood cannot be accomplished effectively.

Alternatively, the hood may be equipped with an exclusive component for releasing the hood-link lock in its locked condition. However, this measure would cause the resulting hood assembly to be deteriorated in view of its total weight and manufacturing cost, disadvantageously.

In the above-mentioned situation, it is an object of the present invention to provide a flip-up apparatus that allows an acceleration of a vehicle's hood in its flip-up motion to be controlled.

In order to attain the above object, according to the prevent invention, a flip-up apparatus for a hood of a vehicle, comprising: a hinge device arranged between a vehicle body and the hood to support the hood rotatably to the vehicle body; and an actuator arranged in the vicinity of the hinge device to lift up the hood at a vehicle collision, wherein the actuator is provided with an active part which is movable upwardly and engageable with a part of the hinge device in an upward movement of the active part.

According to the present invention, since the flip-up apparatus is capable of lifting up the hood together with the active part of the actuator, it is possible to adjust an acceleration of a flip-up motion of the hood itself appropriately. In detail, both velocity and acceleration of the active part of the actuator in its upward movement can be adjusted by alternating a setting pressure of the actuator or the like. Therefore, if only moving the active part of the actuator upwardly under condition that the active part is held by the hinge device attached to the hood, it is possible to adjust an acceleration of the hood in its flip-up motion appropriately.

These and other objects and features of the present invention will become more fully apparent from the following description and appended claims taken in conjunction with the accompanying drawings.

DETAILED DESCRIPTION OF THE PREFERRED EMBODIMENT

Referring to the accompanying drawings, an embodiment of the present invention will be described below.

Figure 1:
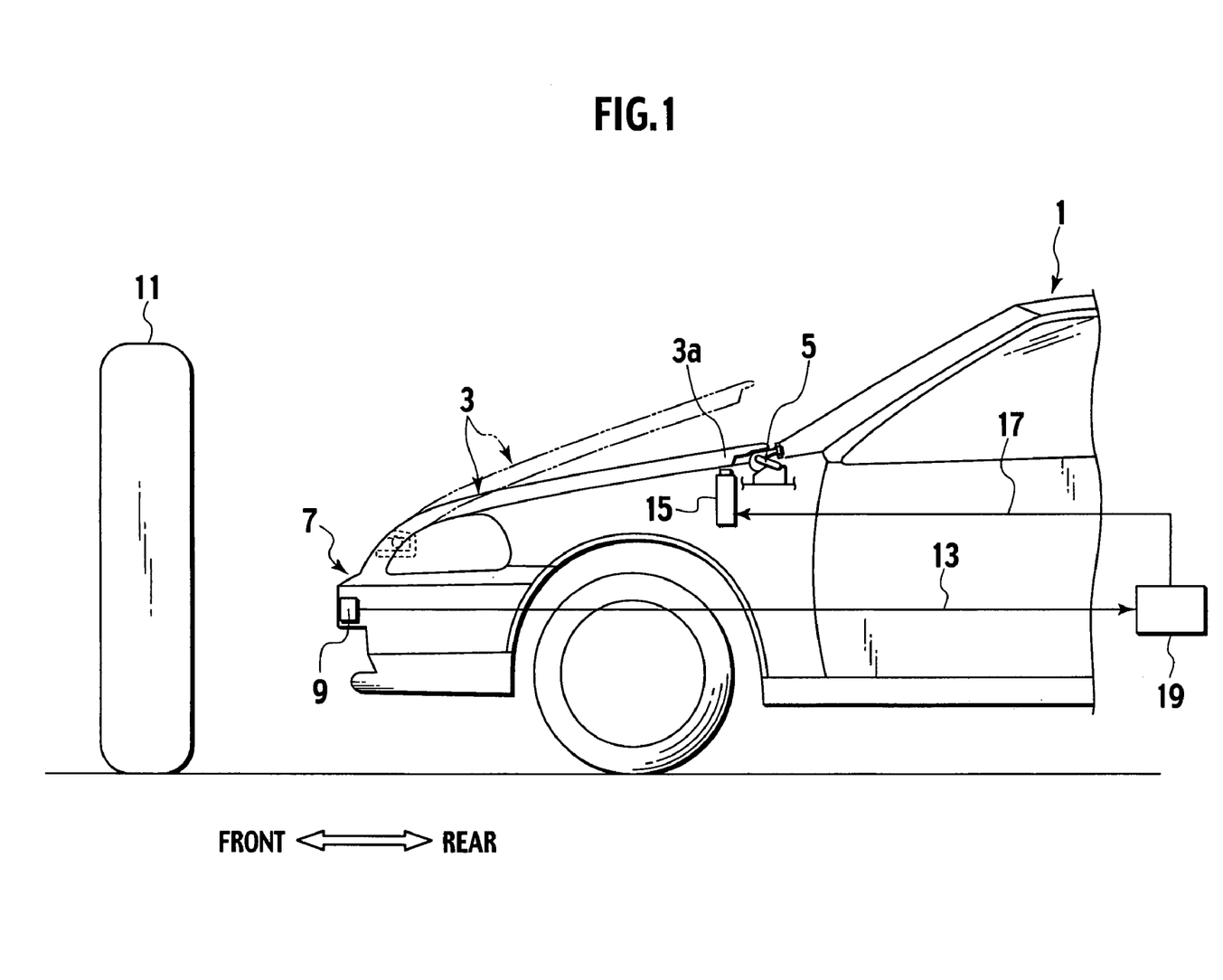
FIG. 1 is a side view showing a front part of a vehicle having a flip-up apparatus for a vehicle hood in accordance with an embodiment of the present invention.

FIG. 1 is a side view showing a front part of a vehicle equipped with a flip-up apparatus for a hood in accordance with the embodiment of the present invention.

At the front part of a vehicle body 1, a hood 3 is arranged to close an upper opening of an engine compartment. This hood 3 is adapted so that its front part opens and shuts about a hinge device 5 at a rear end 3a under normal conditions. While, at a vehicle collision, the rear end 3a of the hood 3 pops upwardly as shown with a two-dotted line of FIG. 1, thereby forming a so-called "flip-up" hood.

A front bumper 7 is arranged at the front end of the vehicle body 1. The front bumper 7 is provided with a bumper sensor 9 that detects a vehicle collision with an obstacle 11. In the vehicle body 1, a control unit 19 is provided to transmit a drive signal 17 to an actuator 15 on receipt of a detection signal 13 outputted from the bumper sensor 9.

Figure 2:
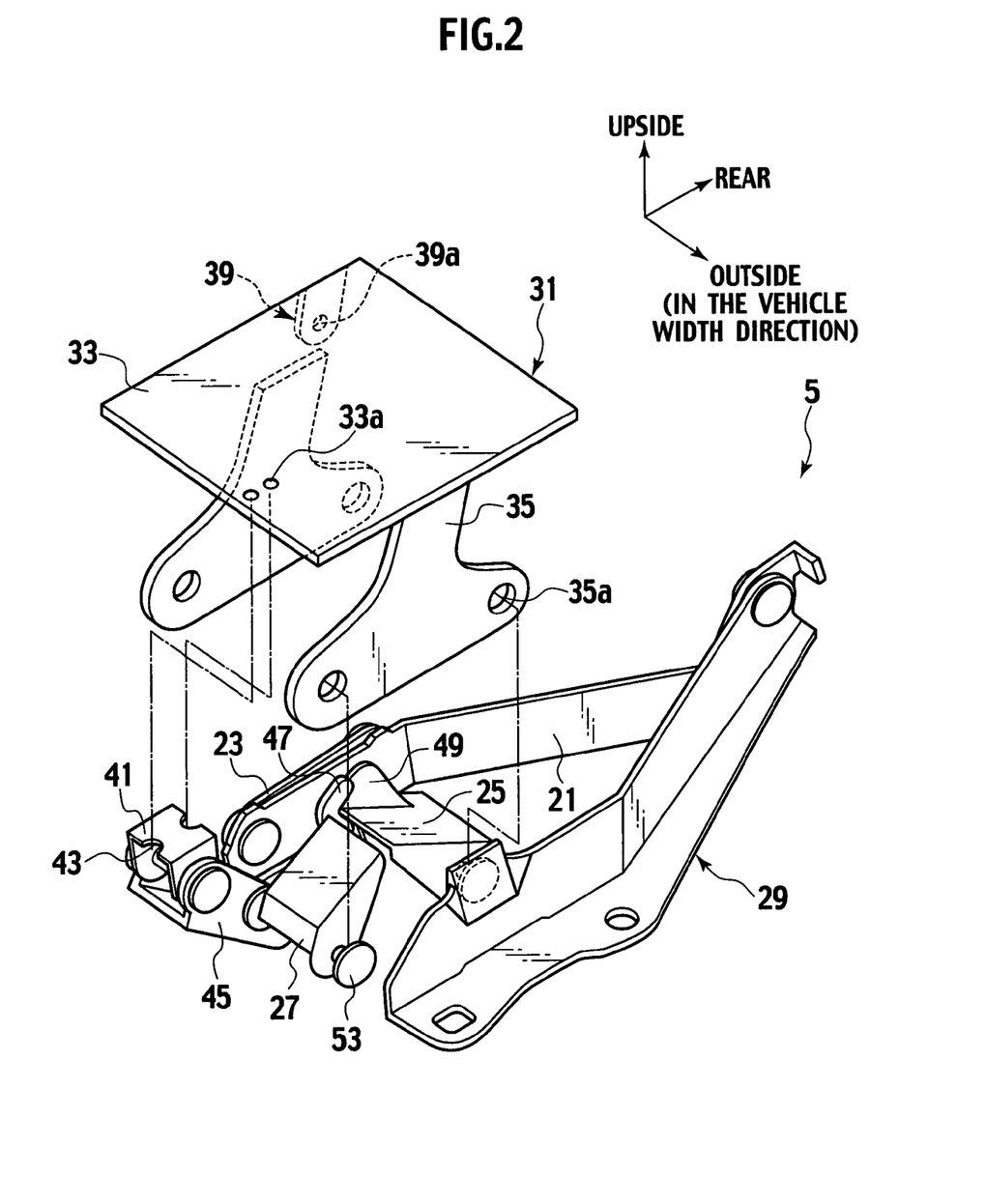
FIG. 2 is an exploded perspective view showing a hinge device in accordance with the embodiment of the present invention.

FIG. 2 is an exploded perspective view showing the hinge device 5 of the embodiment.

The hinge device 5 includes a first arm 21 and a second arm 23 both forming an arm unit that pivotally supports the hood 3 rotatably to the vehicle body 1, and a first lock plate 25 and a second lock plate 27 both forming a lock unit that is arranged on the under face of the hood 3 to hold an active part (top end) of the actuator 15 moving upwardly.

An arm bracket 29 is fastened to a frame member 37 (see FIG. 9) of the vehicle body 1 by means of bolts. The first arm 21 forming the arm unit has its one end pivotally connected to the rear end of the arm bracket 29. The front end of the second arm 23 is pivoted to the other end of the first arm 21. In this way, both of the first arm 21 and the second arm 23 constitute a link assembly. The rear end of the second arm 23 is pivotally supported by a support piece 39 of an attachment plate member 31.

The attachment plate member 31 comprises an attachment plate body 33 in the form of a plate, a pair of support plates 35 extending from the under face of the attachment plate body 33 and the support piece 39 formed at an inside end of the attachment plate body 33 in the vehicle-width direction to extend downwardly. Each of the support plates 35 has its lower portion formed to extend in the fore-and-aft direction of the vehicle and also provided with two support holes 35a, 35a at a predetermined interval. Further, the support piece 39 is provided, at its lower portion, with a support hole 39a that supports an end of the second arm 23 rotatably. The attachment plate body 33 is provided, at its front part, with attachment holes 33a to which recesses 43 of a later-mentioned lock lever bracket 41 are fastened by means of bolts.

Through the lock lever bracket 41, a lock lever 45 is rotatably attached to the attachment plate member 31. In detail, as mentioned before, the lock lever bracket 41 is fastened to the attachment plate body 33 through the bolts. The lock lever 45 is rotatably supported by lock lever bracket 41. An anchor part 47 is formed at the leading end of the lock lever 45 and also engaged with an engagement part 49 of a first lock plate 25 mentioned later.

Here noted, the lock unit comprises the first lock plate 25 and the second lock plate 27 both pivoted to the support plate 35 of the attachment plate member 31 through support pins 53. The first lock plate 25 is shaped so as to be substantially triangular in side view. The first lock plate 25 is provided, at its inner end in the vehicle-width direction, with an engagement part 49. The above-mentioned anchor part 47 of the lock lever 45 is engaged with a corner of the top end of the engagement part 49.

Figure 3:
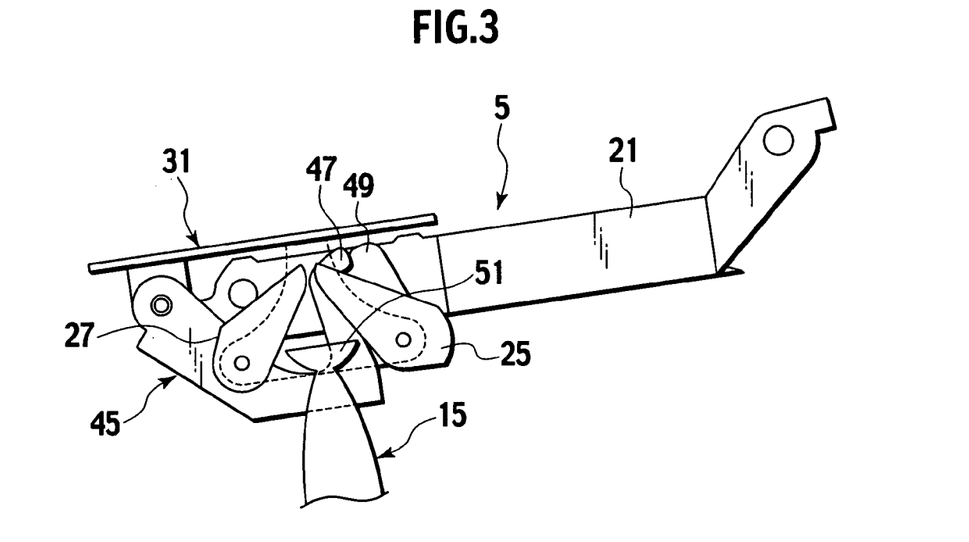
FIG. 3 is a side view of the hinge device in a normal state thereof.
Figure 4:
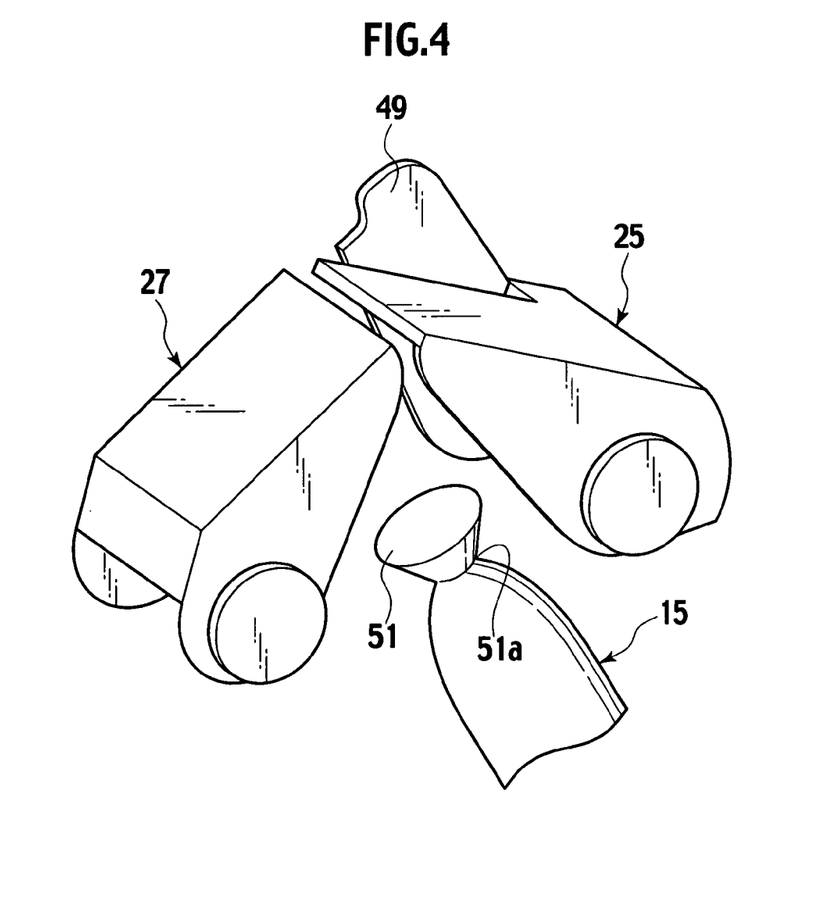
FIG. 4 is a perspective view showing a substantial part of FIG. 3.

The above-constructed flip-up apparatus of the hood 47 operates as follows. FIG. 3 is a side view of the hinge device 5 in its normal state. FIG. 4 is a perspective view showing a substantial part of the hinge device 5 of FIG. 3.

Under condition that the anchor part 47 at the leading end of the lock lever 45 is engaged with the engagement part 49 of the first lock plate 25, the lock lever 45 is prevented from being rotated. Normally, the actuator 15 is positioned below the lock unit formed by the first lock plate 25 and the second lock plate 27.

The actuator 15 has its upper portion formed so as to be a reversed truncated cone, providing a head part (active part) 51. While, the lower portion of the actuator 15 below a neck portion 51a is formed so as to gradually enlarge an actuator's diameter when it comes from the neck portion 51a to the downside.

Figure 5:
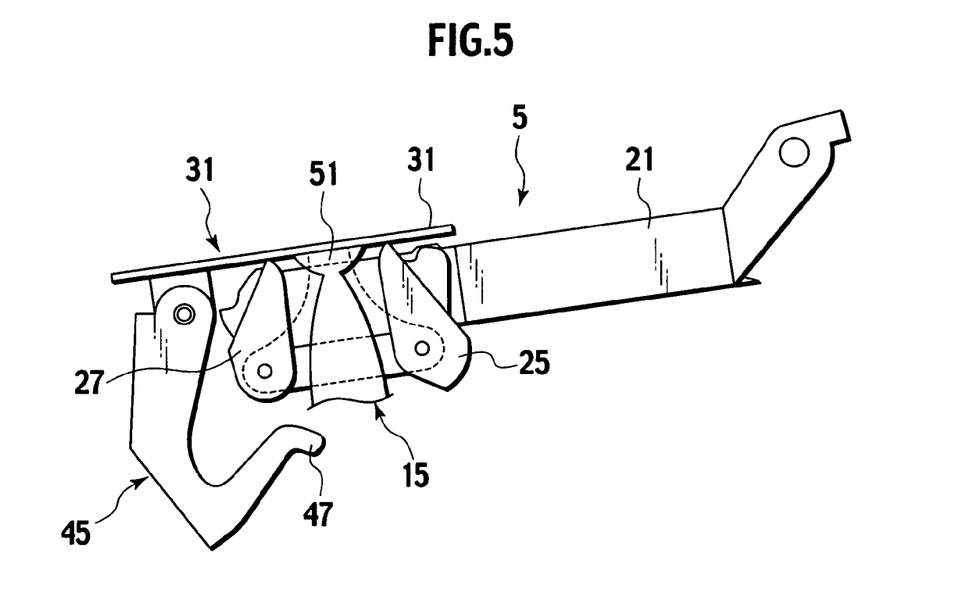
FIG. 5 is a side view showing the hinge device in an early stage of a vehicle collision.
Figure 6:
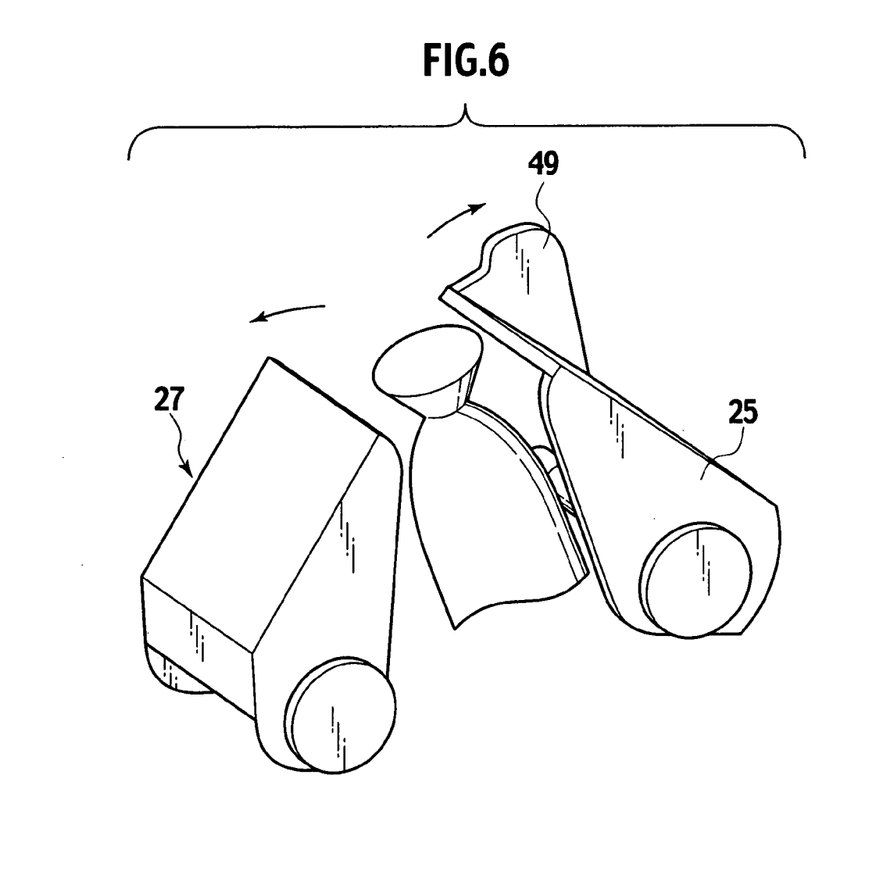
FIG. 6 is a perspective view showing a substantial part of FIG. 5.

FIG. 5 is a side view showing the hinge device 5 at an early stage of a vehicle collision. FIG. 6 is a perspective view showing a substantial part of FIG. 5.

As described with reference to FIG. 1, when the vehicle collides with the obstacle 11, the bumper sensor 9 detects the vehicle collision to transmit the detection signal 17 to the control unit 19. On receipt of the detection signal 13, the control unit 19 transmits the drive signal 17 to the actuator 15. Then, receiving the drive signal 17, the active part of the actuator 15 moves upwardly as shown in FIG. 5, so that the head part 51 unclenches the first lock plate 25 and the second lock plate 27 for pivotal movement. Consequently, the lock lever 45 is released from its locked condition on the first lock plate 25, so that the lock lever 45 rotates downwardly.

Figure 7:
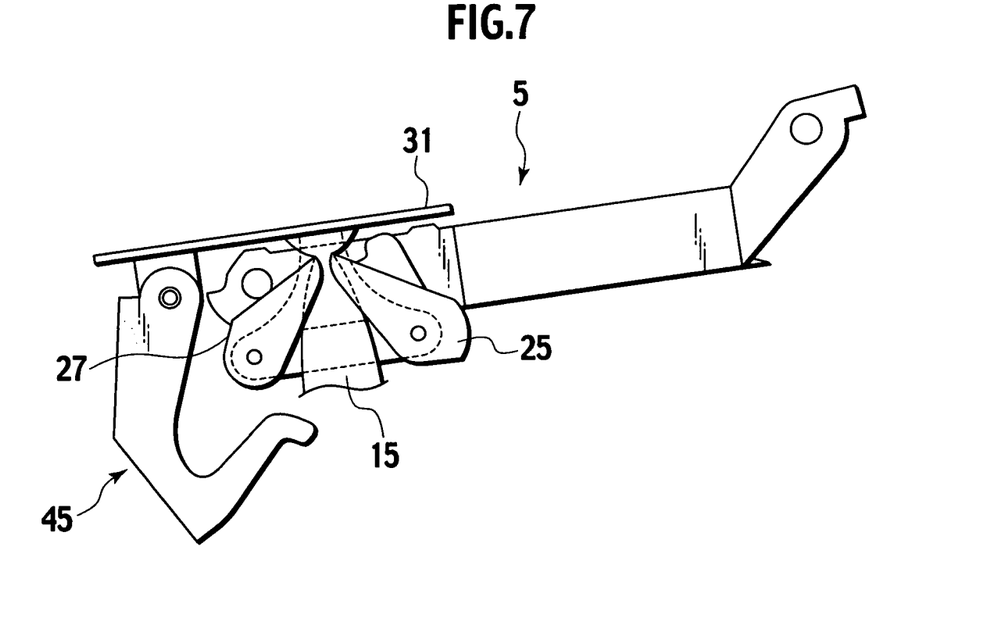
FIG. 7 is a side view of the hinge device when an active part of an actuator abuts on the under face of the hood as a result of a vehicle collision.
Figure 8:
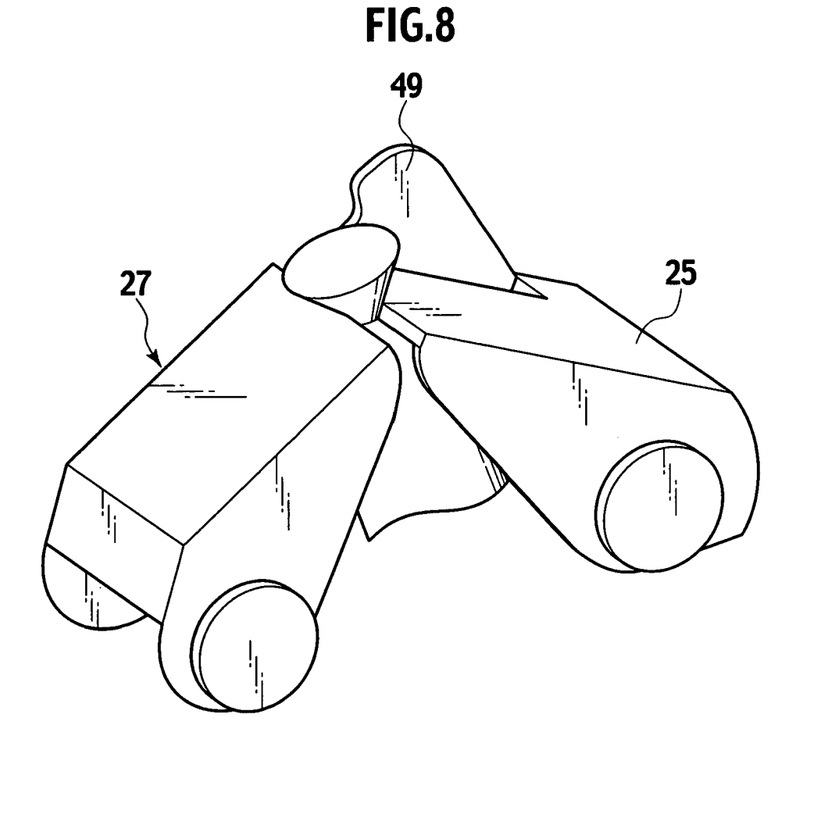
FIG. 8 is a perspective view showing a substantial part of FIG. 7.

FIG. 7 is a side view showing the hinge device 5 when the active part of the actuator 15 is abutting on the under face of the hood as a result of the vehicle collision. FIG. 8 is a perspective view showing the substantial part of FIG. 7.

After the pivotal movement of the first lock plate 25 and the second lock plate 27, they rotate downwardly due to their own weights. Subsequently, the first lock plate 25 and the second lock plate 27 hold the root 51a of the head part (active part) 51 of the actuator 15, while the top end of the actuator 15 abuts on the under face of the hood 3 and lifts it up. Thus, at the subsequent stages, the actuator 15 in one body with the hinge device S operates to lift up the hood 3.

Figure 9:
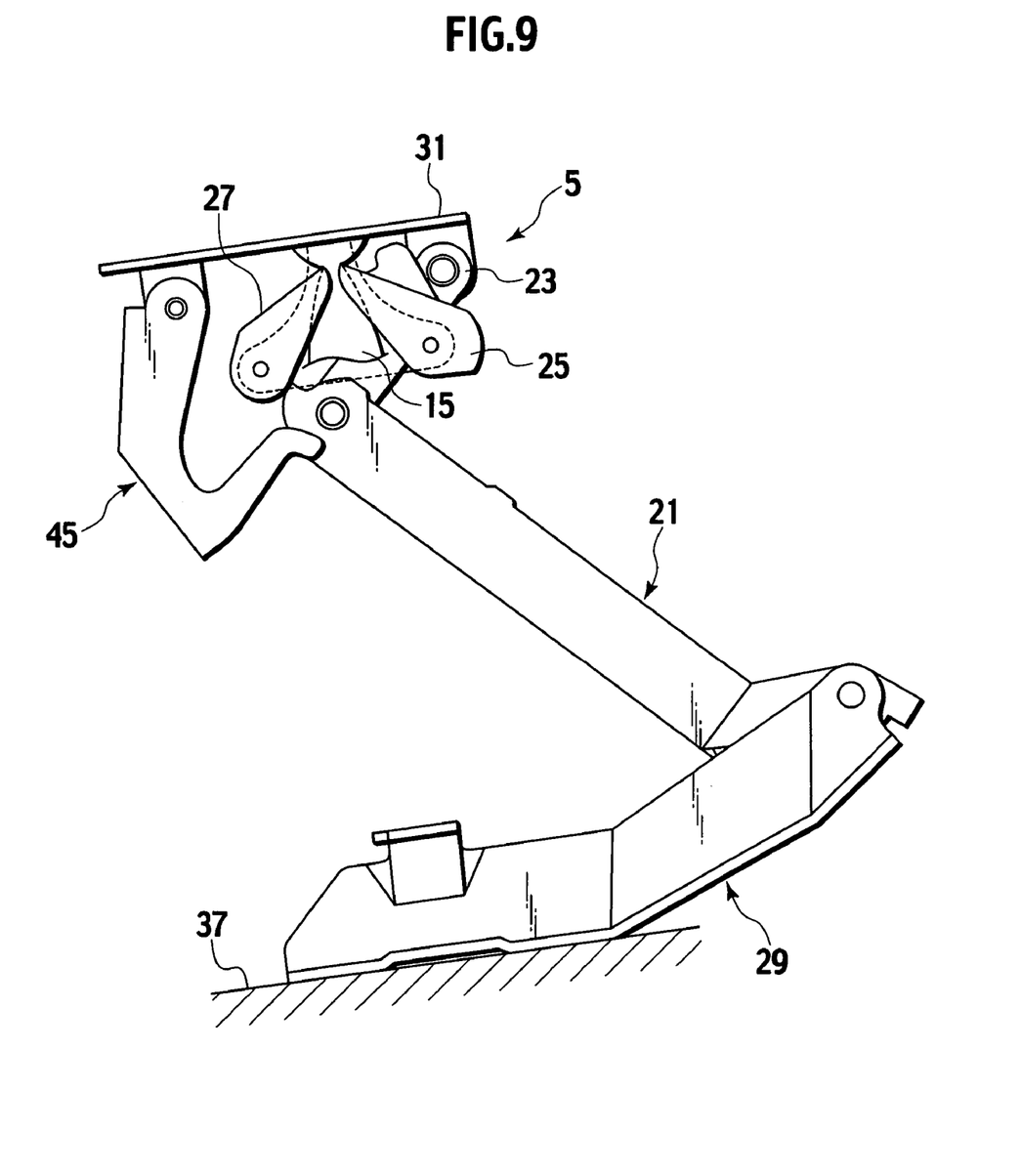
FIG. 9 is a side view showing a condition where the rear end of the hood is lifted up by the actuator.

Thereafter, as shown in FIG. 9, a further upward movement of the active part of the actuator 15 allows the first arm 21 and the second arm 23 to rotate, so that the hinge device 5 moves upwardly together with the hood 3. In detail, the front portion of the first arm 21 rotates upwardly about the rear end of the arm 21 as a pivot, while the rear portion of the second arm 23 rotates upwardly about the front end of the arm 23 as another pivot. Consequently, the rear end 3a of the hood 3 is raised to enable the hood 3 being subjected to a collision load to be deformed certainly, whereby the collision energy can be absorbed effectively.

Figure 10:
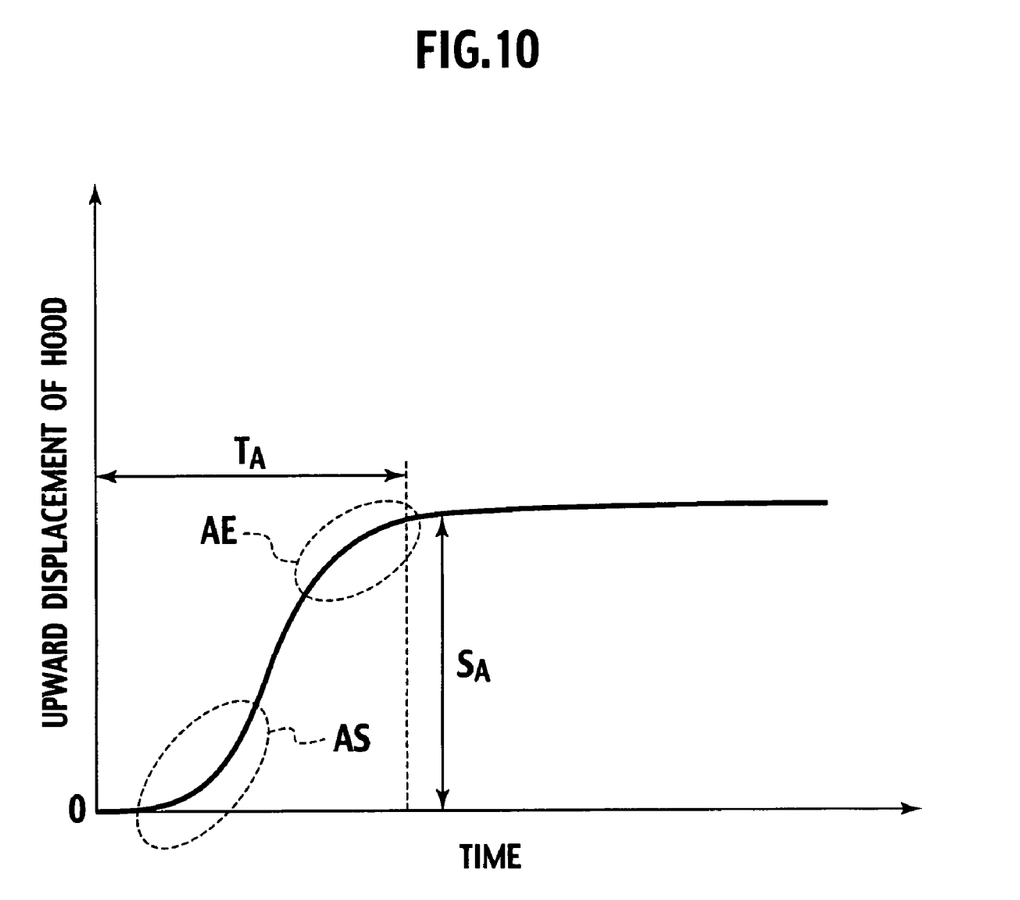
FIG. 10 is a graph showing the relationship between level of the rear end of the hood and time at a vehicle collision.

FIG. 10 is a graph showing the relationship between level of the rear end of the hood at a vehicle collision and time. In FIG. 10, $T_A$ denotes a time required to complete the flip-up action of the hood 3 since a vehicle collision was detected, while $S_A$ denotes a displacement of the hood 3 in its flip-up motion, which is necessary to absorb impact energy applied on the hood 3 as a result of the collision. Similarly, a dashed area AS designates an area where the actuator 15 starts to accelerate in the course of moving the hood 3 upwardly, while a dashed area AE denotes an area where the actuator 15 decelerates in completing the upward movement of the hood 3.

As shown in FIG. 10, at an early stage of the vehicle collision, since the hood 3 gradually moves upwardly on detection of a vehicle collision, an acceleration of the upward movement is relatively small. Subsequently, the velocity of the flip-up motion of the hood 3 is increased. In the vicinity of a completion point of the flip-up motion, the ascending acceleration is gradually reduced for the completion point.

The operation and effect of the present invention will be described below.

As mentioned above, since the hinge device 5 includes the arm unit supporting the hood 3 rotatably to the frame member of the vehicle body and the lock unit having the first lock plate 25 and the second lock plate 27 both holding the head part 51 of the actuator 15, the device 5 enables the hood 3 to move upwardly together with the actuator 15. Therefore, for example, an alternation in gas pressure of the actuator 15 would allow an acceleration of the flip-up motion of the hood 3 to be adjusted appropriately.

Additionally, according to the embodiment, the arm unit is formed by the link assembly having the first arm 21 pivoted to the frame member and the second arm 23 pivoted to the under face of the hood 3. The rotation of the second arm 23 is locked by the lock unit in a normal state, while the locked condition by the lock unit is released by the upward movement of the active part of the actuator 15. That is, since the conventional deformation of a hood link lock is not required in the present invention, it is possible to utilize energy of the active part of the actuator 15 in the upward movement effectively. Again, since the lock unit has a function to release the locked condition, there is no need of providing any exclusive component for releasing the locked arm unit, whereby the number of components and the manufacturing cost can be reduced.

Again, according to the embodiment, the lock lever 45 is rotatably supported on the under face of the hood 3. In the normal state, the lock unit is prevented from rotating by the lock lever 45. While, when a vehicle has a collision, the actuator 15 is moved upwardly to release such a locked condition of the lock unit by the lock lever 45. In this way, locking or unlocking of the lock unit can be accomplished with such a simple structure.

Moreover, since respective tips of the first lock plate 25 and the second lock plate 27 are together tapered off, they can engage the root 51a of the head part 51 of the actuator 15 certainly.

The Japanese Patent Application No. 2004-083436 is incorporated herein by reference in its entirety.

Finally, it will be understood by those skilled in the art that the foregoing descriptions are nothing but one embodiment of the disclosed flip-up for the vehicle hood and therefore, various changes and modifications may be made within the scope of claims.

What is claimed is:

1. A flip-up apparatus for a hood of a vehicle, comprising:
   a hinge device including
   an arm unit comprising a first arm pivoted to a frame member of a vehicle body at one end thereof and a second arm pivoted at one end thereof to the other end of the first arm and the other end of the second arm pivoted to an under face of the hood; and
   a lock unit arranged on the under face of the hood and an actuator arranged in the vicinity of the hinge device to lift up the hood at a vehicle collision, said actuator being provided with an active part which is movable upwardly and engageable with the lock unit in an upward movement of the active part to unlock the lock unit.

2. A flip-up apparatus for a hood of a vehicle, comprising:
   a hinge device including
   an arm unit comprising a first arm pivoted to a frame member of a vehicle body at one end thereof and a second arm pivoted at one end thereof to the other end of the first arm and the other end of the second arm pivoted to an under face of the hood;
   a lock unit including a lock lever pivotably mounted on the under face of the hood and engageable with the arm unit; and
   an actuator arranged in the vicinity of the hinge device to lift up the hood at a vehicle collision, said actuator being provided with an active part which is movable upwardly and engageable with the lock unit in an upward movement of the active part to unlock the lock unit.

3. The flip-up apparatus of claim 2, wherein the lock unit includes a pair of lock plates mounted on the hood such that each of which is pivotable in a direction opposite to each other when the active part of the actuator abuts each of the lock plates.

4. The flip-up apparatus of claim 3, wherein the active part is provided with a neck portion engageable with the each of the lock plates.

* * * * *